Figure 1:
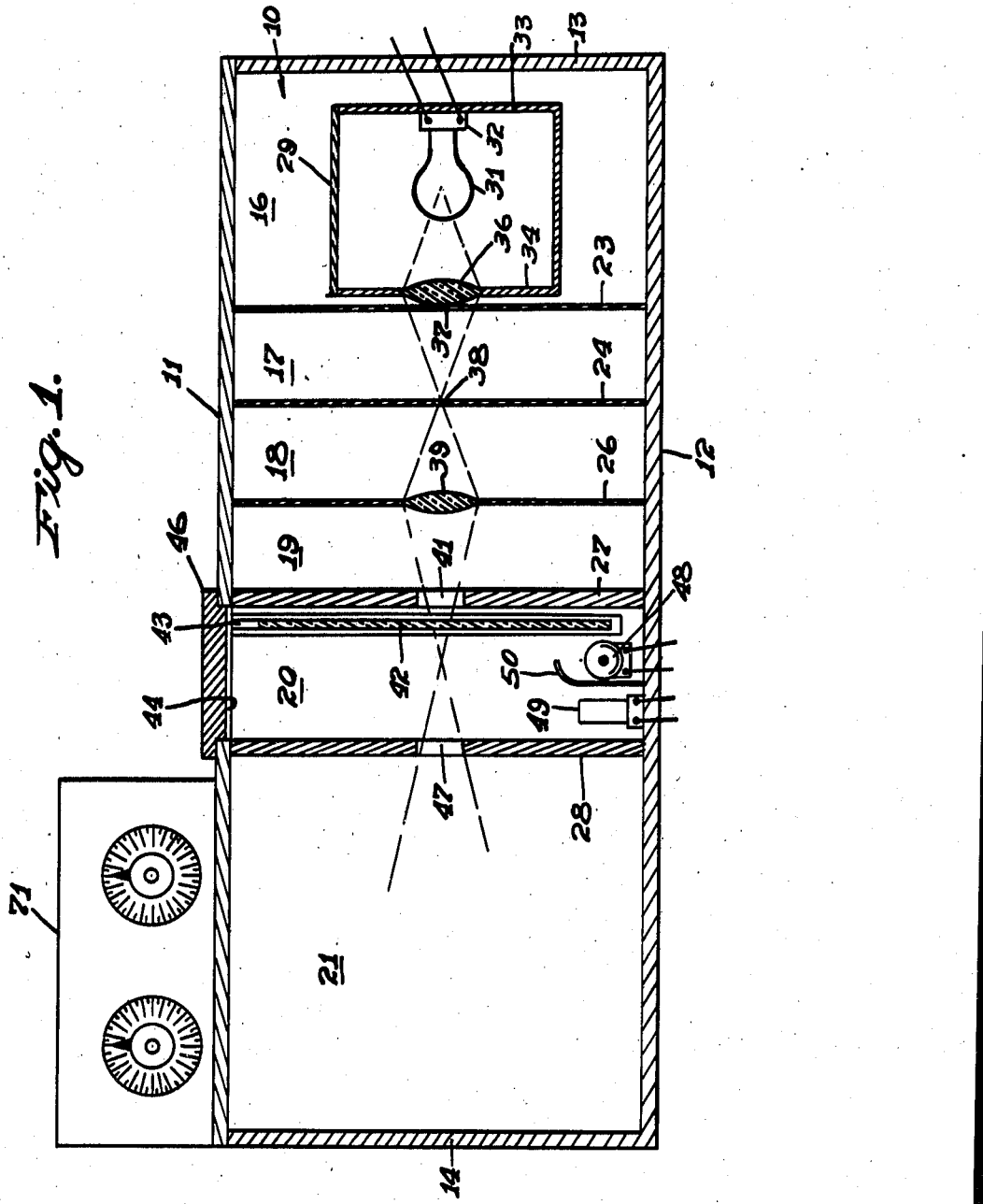

Aug. 26, 1941.                M. L. DEVOL                 2,254,062
                              POLISH METER
                          Filed March 31, 1938        2 Sheets-Sheet 1

INVENTOR.
MANSON L. DEVOL
BY Bradley & Bee
ATTORNEYS.

Aug. 26, 1941.    M. L. DEVOL    2,254,062
POLISH METER.
Filed March 31, 1938    2 Sheets-Sheet 2

INVENTOR.
MANSON L. DEVOL
BY Bradley & Bee
ATTORNEYS.

Patented Aug. 26, 1941

2,254,062

UNITED STATES PATENT OFFICE 2,254,062

POLISH METER

Manson L. Devol, Penn Township, Allegheny County, Pa., assignor to Pittsburgh Plate Glass Company, Allegheny County, Pa., a corporation of Pennsylvania Application March 31, 1938, Serial No. 199,305

1 Claim. (Cl. 88—14)

The present invention relates to apparatus for determining the relative smoothness of surfaces and it has particular relation to apparatus for determining the polish of the surfaces of such transparent materials as glass.

One object of the invention is to provide an apparatus for measuring the polish of plates of glass and similar materials which does not require exercise of any particular degree of judgment upon the part of the operator and which, therefore, in operation is substantially free of inaccuracies arising from inadequacies and irregularities of that faculty.

A second object of the invention is to provide an apparatus for determining the degree of polish of plates of glass which is simple, inexpensive, highly sensitive and which is rapid in operation.

Other objects will be apparent from consideration of the following specification and the appended drawings.

The common method of determining the degree of polish of plates of glass and similar materials has heretofore involved visual comparison of the surface with that of a standard surface. Such comparison, of course, depends upon the judgment of the person making the test. Manifestly, high skill and much experience is required upon the part of the latter. At best the results are highly variable and only rough approximations can be attained.

In my co-pending application Serial No. 181,123, filed December 22, 1937, now Patent No. 2,215,211, of September 17, 1940, are disclosed a process of and apparatus for determining the polish of plates of glass in which a beam of light is obliquely projected against the surface being observed in such manner that the transmitted light passes directly through the plate while that reflected from the surface passes off at an angle and the intensity of this reflected portion is then measured by suitable photometric apparatus. The relative intensity of this reflected component of the beam or ray constitutes a measure of the degree of polish of the plate.

The present invention involves a further embodiment of apparatus for photometrically measuring the degree of polish of plane surfaces, notably surfaces of glass plates. It is distinguished from the form disclosed in my co-pending application by the fact that the beam or ray of light employed in the observation is preferably projected vertically against the surface to be observed and the specularly transmitted components of the beam are trapped off and a photometric reading is made of only a component of light diffused laterally of the beam by reason of irregularities in the surface being observed.

Figure 2:
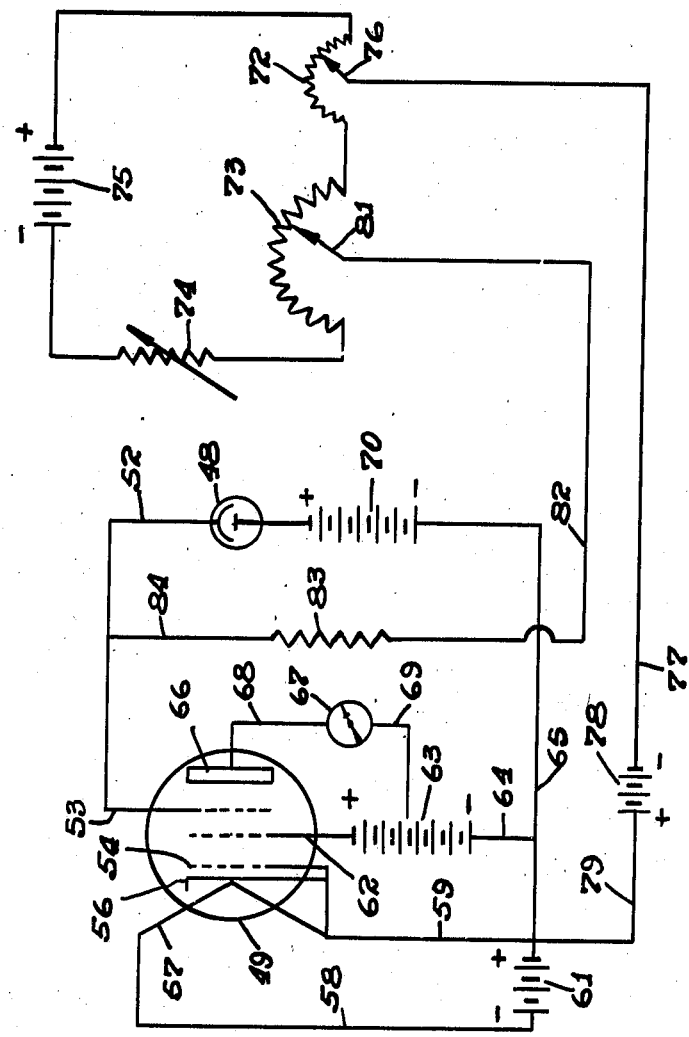

For a better understanding of the invention reference may now be had to the accompanying drawings in which like numerals refer to like parts throughout, and in which Figure 1 is a cross-sectional view, taken in a horizontal plane through an apparatus including one embodiment of the invention, and Fig. 2 is a diagrammatic view of an electric circuit and connections thereof to the apparatus.

In the form of the invention illustrated a light-tight chamber or case 10 having side walls 11 and 12 and end walls 13 and 14 is divided into compartments 16, 17, 18, 19, 20 and 21 by means of a series of partitions 23, 24, 26, 27 and 28. The interior of the walls of the chamber and the partitions preferably are blackened in order to reduce reflection of stray light within the apparatus to a minimum.

Within compartment 16 is disposed a light-tight box 29 which like the walls of chamber 10 and the partitions in the chamber is blackened within and without in order to absorb any stray light which may be present. The box contains a source of light, such as a conventional electrical bulb 31 mounted in a socket 32, upon the rear wall 33 thereof. The front wall 34 of the box opposite the bulb 31 is formed with an opening within which is disposed a condensing lens 36.

Opposite this lens in the partition 23 is an opening 37 through which light from the bulb is projected and focused upon an opening 38 of point of pinhole proportions in the partition 24, which functions substantially as a point source of light. A second lens 39 is disposed in an opening in partition 26 in alignment with lens 36 and pinhole 38 and functions to focus the light transmitted through the pinhole. Partition 27 is also provided with an opening 41 disposed in alignment with lenses 36 and 39 and light passing through the lens 39 passes through this opening into the compartment 20.

Samples 42 of glass or similar material are supported in the latter chamber by suitable means such as grooves 43, formed in the walls of the chamber. Compartment 20 is provided with a lateral opening 44 for the insertion of the samples and this opening may be closed by means of a light-tight cover plate 46. Directly to the rear of the opening 41 is an opening 47 formed in partition 28 and undeflected light passing through the plate 42 passes through this opening into the chamber 21 and is absorbed by the blackened surfaces in the latter.

Light diffused or scattered by the rear face of plate 42 and therefore not passing into chamber 21 for absorption is dependent upon the degree of polish of the surface. In a plate having perfect polish substantially no light will be diffused. In order to determine the degree of polish of the plate a photometric determination is made of the intensity of this diffused light. Any convenient form of photometric device may be employed in making the determination. However, the apparatus should be of relatively sensitive type. In the form of the invention illustrated a suitable photometer comprises a sensitive cell or tube 48, such as RCA photo tube 917. Since the amount of light to be measured is relatively small the output of this tube preferably is amplified by means of electronic amplifiers. An electronic tube 49 known as RCA tube No. 914 constitutes an example of a satisfactory amplifying device. A shield 50 partially enclosing the photoelectric cell excludes light from the amplifying tube.

A suitable circuit for the photoelectric tube and the amplifying tube is described in detail by Gabus & Poole, in the Review of Scientific Instruments, vol. 8, p. 196 (published June 1937). The circuit is illustrated in Figure 2 of the drawings and comprises the photosensitive tube 48 and the amplifying tube 49 interconnected by means of a lead 52 extending between the output side of the photosensitive tube and the suppressor grid 53 of the amplifier. This latter grid in the circuit is employed as the control grid. The regular control grid 54 of the tube is connected to the heated cathode 56 of the tube and in the circuit acts to reduce space charge. Cathode 56 is heated by a conventional filament 57 joined thereto and connected by leads 58 and 59 to a battery 61, of about 4.5 volts which constitutes a source of energy.

The screen grid 62 of the amplifying tube is connected to the positive side of a battery 63 and is employed in the conventional manner. The voltage required of cell 63 will depend somewhat upon the individual characteristics of the amplifying tube employed, but in most cases the voltage probably will approximate 7½ volts. The negative side of battery 63 is connected by lead 64 to lead 65 which is connected to the positive side of battery 61.

The plate or anode 66 of the tube is connected to a microammeter 67 by lead 68. This ammeter in turn is connected by lead 69 to battery 63 at such point as to produce any desired predetermined reading of the microammeter. Lead 65 is further connected to the negative side of a battery 70 of about 45 volts which is joined to the input terminal of photocell 48.

Grid 53 of the amplifying tube is biased by means of apparatus including a potentiometer in a housing 71 and comprising series connected resistances 72, 73 and 74 which in one example were respectively of values of 6000, 9500 and 1500 ohms. Current is circulated through the resistances by a battery 75 of about 67½ volts. The sliding contact 76 of resistance 72 is connected by a lead 77 with a battery 78 of about 6 volts which in turn is connected upon its positive side by lead 79 with the positive side of battery or cell 61. Sliding contact 81 of resistance 73 is connected by line 82 to grid resistance 83, preferably of a value of approximately 10 or more megohms. Lead 84 connects the grid resistance to lead 52 interconnecting the photocell and the control grid of the amplifying tube.

It is to be understood that the voltages of the various batteries and the values of the resistances in the circuit of the potentiometer are merely given by way of example.

In making a determination of the degree of polish of plate 42 in the grooves 43, a beam of light of standard intensity from the bulb 31 is projected through lens 36, pinhole 38, lens 39 and opening 41 approximately perpendicularly to the surface the polish of which is to be determined. Any irregularity of the surfaces causes the light transmitted by the plate to be broken up or scattered through the chamber 20 and a component thereof falls upon the photosensitive cell 48 and reduces the resistance thereof. This permits current to flow from battery 70 through photocell 48 and resistor 83, increasing the potential of lead 52 and grid 53 of the amplifying tube and causes changes in the circuit of the plate of the tube which changes are registered by the microammeter 67. A biasing voltage or current is generated by battery 78 and this voltage increased by that generated by battery 75 across resistances 72 and 73 is applied through resistance 83 to lead 52. Manifestly the higher the value of resistance 83 the greater will be the biasing voltage required to overcome a given current through photo tube 48. Therefore, the higher this resistance the greater is the sensitivity of the apparatus. By adjustment of the slides 76 and 81 of the potentiometer to produce proper biasing of the grid 53 the reading of the microammeter may be made to assume any desired value. The readings of the slides of the resistances 73 and 72 indicate the bias required to produce this reading and therefore by proper calibration of the apparatus it is possible to determine the voltage required to produce the bias. This voltage is a measure of the intensity of the light upon the photosensitive cell. This light in turn is a measure of the diffusion produced by irregularities on the surface of the glass plate.

It will be apparent that the major portion of the light striking the photocell 48 will be that diffused from the face of the glass adjacent thereto. Most of the light diffused from the other face of the plate will be lost because of the effect of refraction at the face adjacent to the photocell. Accordingly, for most purposes a single reading of the transmitted light is sufficient to determine with sufficient accuracy the degree of polish of the surface of the plate.

The polish of the opposite surface may be obtained by reversing the plate to bring the other face adjacent to the photoelectric cell.

Although only the preferred form of the invention has been shown and described, it will be apparent to those skilled in the art that this is merely exemplary and that numerous modifications may be made therein without departing from the spirit of the invention or the scope of the appended claim.

What I claim is:

Apparatus for determining the polish of a glass plate, said apparatus comprising a chamber, the interior surface of which is blackened to absorb light, means in the chamber to hold the plate to be tested, means to project a beam of light against a surface of the plate, means on the opposite side of the plate for entrapping the undiffused component of the beam of light passing through the plate and additional means disposed on the opposite side of the plate from the source of light and out of the line of the beam of light photometrically to determine the intensity of light diffused from the rear of said plate.

MANSON L. DEVOL.